United States Patent Office 2,734,914
Patented Feb. 14, 1956

2,734,914

PRODUCTION OF TEREPHTHALIC AND ISOPHTHALIC ACIDS

Art C. McKinnis, Long Beach, Calif., assignor to Union Oil Company of California, Los Angeles, Calif., a corporation of California No Drawing. Application February 15, 1954, Serial No. 410,430

14 Claims. (Cl. 260—522)

This invention relates to methods for producing terephthalic acid and isophthalic acid by the decarboxylation of trimellitic acid (benzene-1,2,4-tricarboxylic acid), or of mixtures of benzene polycarboxylic acids which contain a large proportion of trimellitic acid. More specifically, the invention is directed to a particular method of decarboxylation which is extremely simple, requires no expensive reagents, and which is cooperatively associated with an economical method for separating the crude acids.

Briefly, the process comprises heating the pure or crude trimellitic acid with a substantially neutral aqueous reagent at elevated temperatures and pressures until substantial mono-decarboxylation has occurred, and then separating the resulting acid mixture to obtain terephthalic acid and isophthalic acid. The preferred method for separation consists in subjecting the reaction mixture to filtration, or other liquid-solid separation procedure, at a temperature which is between about 100° C., but preferably about 200° C., and the reaction temperature. The reaction temperature is ordinarily above about 250° C. By operating in the manner described, the crude decarboxylation product will contain terephthalic acid and isophthalic acid in approximately a 40/60 mole-ratio. The preferred volume of neutral aqueous reagent employed relative to the trimellitic acid is such that, at the filtration temperature, substantially pure terephthalic acid remains in the solid phase, while substantially all the isophthalic acid remains dissolved, along with other soluble acids.

A primary object of this invention is to provide a method for decarboxylating trimellitic acid to produce the highest ratio of terephthalic to isophthalic acid which is consistent with the use of inexpensive reagents and operating conditions. A further object is to provide such a decarboxylation method which is also correlated with a specific subsequent purification system to thereby effect substantial economies in the latter. A broader object is to provide more economical, plentiful, and versatile raw materials for terephthalic and isophthalic acids than have heretofore been utilized. Still another object is to provide methods for the recovery of other valuable by-products from the process, e. g. benzoic acid and orthophthalic acid. Still further objects include the provision of techniques for the process which will reduce corrosivity, heat requirements, and reaction time to practical minimum values. Other objects and advantages will be apparent to those skilled in the art from the more detailed description which follows.

The aromatic dicarboxylic acids are highly important industrial raw materials by virtue of their use in the manufacture of polymeric esters fir resins and synthetic fibers, monomeric esters for plasticizers, solvents and similar materials.

Of these acids, terephthalic acid is at present the most valuable, mainly because of its use in the manufacture of polymeric esters for synthetic fibers such as Dacron.

In the past, terephthalic acid has generally been manufactured by the controlled oxidation of pure para-xylene. This process is economically undesirable in that it requires as the starting material substantially pure para-xylene, which is difficult to separate from meta-xylene. Alternatively, a mixture of isomeric xylenes may be oxidized to produce a mixture of the corresponding dibasic acids i. e. ortho-phthalic, isophthalic and terephthalic acids. Usually the oxidation product is contaminated with small amounts of benzoic acid and/or toluic acids. Benzoic, toluic and ortho-phthalic acids may be easily removed by solvent extraction with water. However, the separation of the remaining isophthalic acid from the terephthalic acid is more difficult and expensive. The previously known solvent extraction techniques involve the inherent disadvantage that the acids are very slightly soluble in the ordinary, economically desirable solvents. Therefore, it is necessary to use excessively large volumes of such solvents, at least at ordinary temperatures and pressures. Although I am not aware that any high-temperature, high-pressure solvent techniques have been employed in the past, the use of such techniques is contraindicated, even if found to be operable, by the expense involved in the construction and maintenance of high pressure vessels, pipe-lines and filtration equipment. In the present case however, this latter objection is at least partly nullified because the decarboxylation step itself requires high temperatures and pressures. The reaction medium, i. e. water, is also the cheapest known solvent, and is known to exhibit a selective solvent capacity for isophthalic acid at low temperatures. I have now discovered that water at high temperatures, e. g. 200° C., still exhibits a marked selectively for isophthalic acid, while at the same time its solvent capacity for isophthalic acid is about 10 times that at 100° C. These factors cooperate in rendering water an effective solvent for separating isophthalic from terephthalic acid in the present process.

While this invention is directed primarily to the production of terephthalic acid, the isophthalic acid produced is also a valuable product. This material is useful for producing plasticizers, solvents and the like, as well as resins. Ortho-phthalic acid is most used for such purposes but isophthalic acid is equal or superior for most applications. However, since ortho-phthalic acid may be cheaply manufactured by the oxidation of naphthalene, whereas isophthalic acid requires, incident to its manufacture, either the difficult separation of meta- and para-xylenes or the difficult separation of meta- and para-phthalic acids, ortho-phthalic acid has found the wider use. According to the present invention isophthalic acid is produced from inexpensive, easily obtainable raw materials, and no expensive separations are involved, thereby rendering isophthalic acid competitive with ortho-phthalic acid.

The present invention takes an entirely new approach to the production of isophthalic and terephthalic acids. The trimellitic acid employed as starting material may be readily obtained by the oxidation of 1,2,4-trimethyl benzene (pseudocumene), or other 1,2,4-trialkyl benzenes. Pseudocumene, the principal hydrocarbon raw material, may be readily separated by fractional distillation from the C-9 aromatic fraction obtained for example from the catalytic reforming or hydroforming of cracked and/or straight-run gasoline fractions. The use of 1,2,4-trialkyl benzenes provides a much more economical, plentiful, and versatile source of raw materials than the xylene fractions provide.

Very little is apparently known about the decarboxylation of trimellitic acid. It is known generally that polycarboxylic aromatic acids which contain ortho-carboxyl groups may be decarboxylated under the influence of heat and/or catalysts to remove one of the ortho-carboxyl groups. Ortho-phthalic acid and hemimellitic acid (1,2,3-benzene tricarboxylic acid) for example may be monodecarboxylated to produce respectively benzoic acid and isophthalic acid. Insofar as I am aware however, no decarboxylation methods are now known for producing substantially pure isophthalic acid or terephthalic acid from higher carboxylated acids, nor for monodecarboxylating trimellitic acid in the 1- or 2-position.

I have found that by altering the reagents and/or conditions of decarboxylation, it is possible to alter considerably the isomeric distribution of the resulting dibasic acids. In a copending application, Serial No. 408,997, filed February 8, 1954, I have shown that heating trimellitic acid in the presence of certain proportions of aqueous alkali results in the production of substantially pure isophthalic acid. In the present case, the cheapest known reagent, i. e. water, is found to give an acid mixture wherein the isomer distribution and the reaction conditions employed are fortuitously interrelated to provide a simple and economical means of separation.

The actual process employed for achieving the results herein described is extremely simple. Trimellitic acid, either in pure form or admixed with other oxidation products, is admixed with the desired proportion of water, and the mixture is then heated under pressure at e. g. 150°–400° C., and preferably between about 220° and 350° C., preferably until the evolution of $CO_2$ ceases. This usually requires from about 15 minutes to 3 hours, depending upon the temperature. Under the stated temperature conditions the pressure in the reaction vessel will vary between about 15–190 atmospheres, providing that the $CO_2$ formed is continuously removed.

The term substantially neutral reagent which is essentially water, as employed herein and in the claims is intended to mean any predominantly aqueous medium which is neither appreciably acidic nor appreciably basic, and which performs the essential function of pure water as described herein. The initial pH of the reagent, before admixture with trimellitic acid, should preferably be between about 5 and 9. If the initial reagent is more acidic, i. e. if an extraneous acid is added thereto, it is found that the decarboxylation is retarded, and substantially no decarboxylation will occur under the stated reaction conditions. The preferred reagent is ordinary tap water, or distilled water, with no other additions. However, in some cases, as when low temperatures are employed, it may be desirable to add certain neutral accelerators such for example as soluble copper salts or manganese salts.

The proportion of water employed relative to the trimellitic acid is not critical to the decarboxylation process itself. Any amount of water is operative to some extent, but is is found that the larger the ratio of water to trimellitic acid, the more rapid will be the decarboxylation. It is therefore preferred to employ at least about 500 ml. of water per mole of trimellitic acid in order to accelerate the reaction.

If the preferred separation procedure is employed, it may be desirable to employ even more water than is necessary to obtain rapid reaction. For this purpose sufficient water should be employed so that when 60 mole percent of the trimellitic acid is converted to isophthalic acid, that amount of isophthalic acid will still remain in solution at the temperature which is to be employed for separating terephthalic acid. The amounts to be employed for obtaining these objectives will be apparent from the following table which shows the approximate solubilities of isophthalic acid and terephthalic acid in water at various temperatures. At each temperature listed, the corresponding amount of trimellitic acid which will produce a saturated isophthalic acid solution at that temperature is also listed:

TABLE 1

| Temp., ° C. | Solubility, gms./100 ml. $H_2O$ | | (b) |
| --- | --- | --- | --- |
| | isophthalic acid | terephthalic acid | |
| 20 | 0.011 | 0.0016 | |
| 60 | (a) 0.06 | (a) 0.005 | |
| 100 | 0.27 | 0.03 | 0.5 |
| 203 | 2.6 | 0.3 | 5.46 |
| 270 | (a) 10 | (a) 1.1 | 21 | a Interpolated or extrapolated data.
b Grams of trimellitic acid per 100 ml. water which would yield saturated isophthalic acid solution, assuming 60 mole-percent conversion to the latter.

It will be seen from the above table that if the filtration temperature is for example 270° C., the solubility of isophthalic acid is approximately 100 gms. per liter. In order to produce that amount of isophthalic acid it is necessary to employ initially about 1 mole (210 grams) of trimellitic acid per liter of water, assuming that the latter is completely decarboxylated, and 40% thereof is converted to terephthalic acid and 60% to isophthalic acid. Under these conditions it is apparent that approximately 11 grams per liter of terephthalic acid will be dissolved while 54 grams thereof will remain in the solid phase in substantially pure state.

In some cases, where it is desirable to employ lower filtration temperatures, the initial ratio of trimellitic acid to water may be undesirably low from the standpoint of economical operation. In such cases, it is feasible to obtain the benefits of the preferred separation procedure, and avoid the use of excessively large volumes of water by adding to the reaction mixture a small proportion of methanol, ethanol, glycol or other organic compound which will increase its solvent capacity for isophthalic acid. The organic hydroxy compounds used as solvent modifiers tend to accelerate the decarboxylation, but also tend to increase the ratio of isophthalic acid/terephthalic acid in the product. Therefore, if isophthalic acid is primarily desired, the solvent modifier should be added before or during the decarboxylation. If terephthalic acid is primarily desired, the modifier should be added after completion of the decarboxylation. Ordinarily only about 10–30% by volume of the organic hydroxy compound need be added in order to about double the solubility of isophthalic acid in the reagent. The selectivity of the solvent is not appreciably altered by the addition of such modifiers. The preferred temperature for filtration is between about 100° and 350° C., and preferably between about 200° and 300° C.

According to another modification of the invention, it is possible to obtain the benefits of the preferred separation procedure while at the same time operating in a continuous manner, and without using extraneous solvent modifiers or unduly large amounts of water. According to this modification, before sufficient isophthalic acid is formed to saturate the mixture at the temperature $T_1$ to be employed for separating terephthalic acid, but after sufficient thereof has been formed to over-saturate the mixture at a lower temperature $T_2$, a slip-stream is withdrawn from the reaction mixture, filtered at approximately the reaction temperature or slightly below ($T_1$) in order to remove the pure terephthalic acid as it is formed, then cooled further to $T_2$ to precipitate out the bulk of the isophthalic acid. The latter is continuously removed as by filtration, thereby leaving a slip-stream mother-liquor which is depleted in dibasic acids, but still contains some trimellitic acid. This liquor is then reheated and returned to the reaction vessel, with or without addition thereto of make-up trimellitic acid. In this manner the ratio of solvent to isophthalic acid in the reaction mixture may be maintained at a substantially constant desired level, regardless of the initial ratio of water to trimellitic acid. The trimellitic acid is soluble in all proportions in water at the preferred reaction temperatures.

In another modification of the process, a crude mixture of carboxylic acids obtained by the oxidation of mixtures of isomeric C-9 and/or C-10 aromatic hydrocarbons may be decarboxylated to give a final product which is 55-65% isophthalic acid and 35-45% terephthalic acid. The mixed aromatic hydrocarbons may be obtained by known methods from gasolines which have been subjected to catalytic reforming or hydroforming operations. The isomer distribution in the C-9 and C-10 aromatic fractions obtained from such gasolines is such that the oxidation-decarboxylation product, after removal of the more water-soluble acids, is usually 55-65% isophthalic acid, the remainder being almost exclusively terephthalic acid. The principal hydrocarbons in such fractions, and their corresponding oxidation and decarboxylation products are shown in the following table:

TABLE 2

| Hydrocarbon | Boiling point, °C. | Acid obtained by oxidation | Principal decarboxylation product, and water-solubility thereof |
|---|---|---|---|
| C-9 Aromatics: | | | |
| isopropylbenzene | 152.4 | benzoic | benzoic (s.). |
| propylbenzene | 159.2 | ___do___ | benzoic (s.). |
| m-ethyltoluene | 161.3 | m-phthalic | m-phthalic (s. s.). |
| p-ethyltoluene | 162.0 | p-phthalic | p-phthalic (ins.). |
| mesitylene (1,3,5-trimethyl benzene). | 164.7 | trimesic | trimesic (v. s.). |
| o-ethyltoluene | 165.1 | o-phthalic | o-phthalic (s.). |
| pseudocumene (1,2,4-trimethyl benzene). | 169.1 | trimellitic | m-phthalic (s. s.) 60%, p-phthalic (ins.) 40%. |
| hemimellitene (1,2,3-trimethyl benzene). | 176.1 | hemimellitic | m-phthalic (s. s.). |
| C-10 Aromatics: | | | |
| m-diethylbenzene | 181 | m-phthalic | m-phthalic (s. s.). |
| o-diethylbenzene | 183 | o-phthalic | o-phthalic (s.). |
| p-diethylbenzene | 184 | p-phthalic | p-phthalic (ins.). |
| 2-ethyl-p-xylene | 185 | trimellitic | m-phthalic (s. s.) 60%, p-phthalic (ins.) 40%. |
| 5-ethyl-m-xylene | 186 | trimesic | trimesic (v. s.). |
| 4-ethyl-o-xylene | 186 | trimellitic | m-phthalic (s. s.) 60%, p-phthalic (ins.) 40%. |
| durene (1,2,4,5-tetramethyl benzene). | 194 | pyromellitic | m-phthalic (s. s.) 60%, p-phthalic (ins.) 40%. |
| isodurene (1, 2, 3, 5-tetramethyl benzene). | 197 | prehnitic | trimesic (v. s.). |

It will be seen therefore that the least soluble acids in the final mixture are isophthalic and terephthalic. The more water-soluble acids usually comprise only a minor proportion of the total decarboxylation product.

The crude terephthalic acid which is initially separated from the reaction mixtures is ordinarily sufficiently pure after a simple water wash for most uses. However, it may be further purified if desired, as by washing with hot water or hot methanol and the like. The product may be recrystallized if desired from other solvents.

The isophthalic acid which remains in the various mother liquors may be recovered e. g. by successively cooling, with resulting fractional crystallization, to obtain acids of any desired degree of purity. The first batch of crystals obtained by such cooling will ordinarily contain most of the dissolved terephthalic acid, along with some isophthalic. This first strike may be conveniently recycled to the next batch of reaction liquor. The bulk of the isophthalic acid is obtained by further cooling the second mother liquor. Its purity may range between about 85-98%, depending upon the conditions. If a complex acid mixture was employed in the decarboxylation, the isophthalic acid may be further purified by distillation or sublimation to remove phthalic anhydride and/or benzoic acid as distillate. Any trimesic acid present will ordinarily carry through to the last mother liquor since it is most soluble. Traces thereof may be removed from the solid isophthalic or terephthalic acids by water washing.

The invention may perhaps be more readily understood from the following examples which are, however, illustrative only:

*Example I*

This example illustrates the effects obtained by varying the hydrogen-ion concentration of the aqueous reagent, and shows the critical relationship existing therein.

One-half mole (105 gms.) of trimellitic acid is placed in each of four stainless steel pressure vessels equipped with agitators and pressure relief valves. About 500 ml. of water is then added to each vessel. To vessel No. 1 is added 60 gms. (1.5 moles) of sodium hydroxide. To vessel No. 2 is added 4 gms. (0.1 mole) of sodium hydroxide. No alkali is added to the third vessel. To the fourth vessel is added 15 ml. of phosphoric acid. Each vessel is then heated with stirring at 250°-290° C. for 1.5 hours, after which time the evolution of $CO_2$ substantially ceases. The contents of each vessel is then cooled to about 80° C. and filtered. The solid precipitate in each case is washed with 400 ml. of hot water, and then dried in an air stream at 70° C. Analysis of the products from the three runs gives the following comparative data:

TABLE 3

| Product | Wt., gms. | Isophthalic acid, Wt. Percent | Terephthalic acid, Wt. Percent | Total Conversion to Dibasic acids |
|---|---|---|---|---|
| Vessel No. 1 | | (1) | (1) | |
| Vessel No. 2 | 67 | 96.1 | 3 | 80.7 |
| Vessel No. 3 | 58 | 60.2 | 39 | 70.0 |
| Vessel No. 4 | | (2) | (2) | |

[1] No solid product obtained.
[2] Traces of insoluble acids formed.

Further analysis of the soluble product from vessel No. 1 showed it to consist of trisodium trimellitate almost exclusively. The aqueous mother liquor from vessel No. 2 is found to contain about 18 gms. of trimellitic acid in the form of sodium salts, and the total yield of dibasic acids from this run, based on trimellitic acid converted, is therefore 97.5%. The aqueous mother liquor from vessel No. 3 is found to contain about 30 grams of unreacted trimellitic acid, and the yield from this run is therefore 98.5%.

This example shows that effective decarboxylation is obtained only in those cases where the aqueous reagent is neutral or slightly alkaline. Acidic or highly alkaline reagents greatly retard the decarboxylation.

Example II

This example illustrates specifically one modification of the preferred separation technique.

One-half mole (105 gms.) of trimellitic acid is placed in a stainless steel pressure vessel equipped with a gas pressure relief valve and a valved liquid withdrawal port in the lower section. About 500 ml. of tap water is then added, and the contents are heated at 325° C. for one-half hour, while continuously withdrawing $CO_2$. Without releasing the pressure, the contents are then allowed to cool to about 270° C. After a 15 minute period of agitation at this temperature, the valve in the liquid withdrawal port is opened and the contents are forced under pressure through an enclosed filtration unit. The precipitate is washed with warm water, dried and weighed. Twenty-seven grams of 98% pure terephthalic acid is obtained, representing a yield of 32.6%.

The mother liquor is then cooled to room temperature (25° C.) and filtered. The precipitate is washed with 200 ml. of warm water, dried and weighed. About 52 grams of 89% pure isophthalic acid is obtained, representing a yield of 55.5%. The total conversion to dibasic acids is about 90 mole-percent.

Example III

This example illustrates the results obtainable by decarboxylating the mixed acids obtained by oxidation of a mixture of C–9 and C–10 aromatic hydrocarbons.

The mixed acids are obtained by oxidizing a C–9, C–10 fraction (B. P. 150–200° C.) of the aromatic hydrocarbons extracted from a full-range naphthenic gasoline which had been subjected to hydroforming-aromatization in the presence of a platinum-alumina catalyst at 950° F., 1.0 L. H. S. V., 10,000 S. C. F. of hydrogen/bbl. of feed, and at a pressure of 200 p. s. i. g.

The C–9, C–10 hydrocarbon fraction was oxidized first with air in the presence of 1% of a cobalt naphthenate catalyst at 150° C. for 3 hours, and then with 30% nitric acid at 200° C. for 1 hour in the absence of catalyst.

The oxidation mixture, which comprises mainly trimellitic, trimesic, hemimellitic, pyromellitic, prehnitic, o-, m- and p-phthalic, and benzoic acids is then subjected to decarboxylation under the conditions outlined in Example II, employing 600 ml. of water and 200 grams of the total solid acid mixture. The product is composed approximately as follows:

| Component: | Weight percent |
| --- | --- |
| Benzoic acid | 1.5 |
| o-Phthalic acid | 4.6 |
| Trimesic acid | 12 |
| p-Phthalic acid | 29 |
| m-Phthalic acid | 51 |

This mixture is then water-washed to remove the trimesic, benzoic and o-phthalic acids, leaving a final product which is approximately 63.2% isophthalic acid and 36.7% terephthalic acid. This example shows that the bulk of the higher hydrocarbons such as durene, 4-ethyl-o-xylene, 2-ethyl-p-xylene, as well as substantially all of the pseudocumene and hemimellitene are ultimately converted to isophthalic and terephthalic acid. The 1,3,5-hydrocarbons are converted to trimesic acid which is readily separated by water washing. The original para- and meta-dialkyl benzenes yield the respective para- and meta-acids.

Substantially the same ultimate results are obtained in all the above examples when the reaction conditions, i. e. temperature, proportion of aqueous reagent etc. are varied within the stated limits.

The foregoing disclosure of this invention is therefore not to be considered as limiting since many variations may be made by those skilled in the art without departing from the scope or spirit of the following claims:

I claim:

1. A method for decarboxylating trimellitic acid to form isophthalic acid and terephthalic acid which comprises heating trimellitic acid at a temperature between about 150° and 400° C. in the presence of a substantially neutral reagent which is essentially water, and recovering the resulting isophthalic acid and terephthalic acid.

2. A method as defined in claim 1 wherein said heating is at a temperature between about 220° C. and 350° C.

3. A method as defined in claim 1 wherein the initial proportion of said aqueous reagent is at least about 500 ml. per mole of trimellitic acid.

4. A method for preparing and separating isophthalic acid and terephthalic acid which comprises dissolving trimellitic acid in a substantially neutral reagent which is essentially water, heating the resulting solution in a reaction zone at a decarboxylating temperature $T_0$ between about 150° and 400° C. for a period of time not exceeding that required to saturate the reaction mixture with isophthalic acid at a filtration temperature $T_1$ as hereinafter defined, withdrawing at least a portion of said reaction mixture and separating terephthalic acid therefrom at a temperature $T_1$ which is not substantially lower than $T_0$, further cooling said portion of reaction mixture to a second filtration temperature $T_2$ which is substantially lower than $T_1$ to thereby precipitate isophthalic acid, removing said isophthalic acid and returning the mother liquor to said reaction zone.

5. A method as defined in claim 4 wherein said mother liquor is augmented with additional trimellitic acid before being returned to said reaction zone.

6. A continuous method for preparing and separating isophthalic acid and terephthalic acid which comprises dissolving trimellitic acid in a substantially neutral reagent which is essentially water, heating the resulting solution in a reaction zone at a decarboxylation temperature $T_0$ between about 150° and 400° C., continuously withdrawing from said reaction zone a slip-stream of the partially reacted mixture, removing terephthalic acid from said slip-stream at a temperature $T_1$ which is not substantially lower than $T_0$, further cooling said slip-stream to a temperature $T_2$ which is substantially lower than $T_1$, to thereby precipitate isophthalic acid, removing the precipitated isophthalic acid, and returning the final mother liquor to said reaction zone, the flow rate of said slip-stream relative to the total reactant volume being adjusted so that the proportion of isophthalic acid present in any part of the liquid system never exceeds its solubility at said temperature $T_1$.

7. A method as defined in claim 6 wherein said slip-stream is augmented with additional trimellitic acid before being returned to said reaction zone.

8. A method for preparing and separating isophthalic acid and terephthalic acid which comprises dissolving trimellitic acid in a substantially neutral reagent which is essentially water, and heating the resulting solution at a decarboxylation temperature between about 150° and 400° C. until a substantial proportion of isophthalic and terephthalic acids are formed, separating terephthalic acid from said reaction mixture at a temperature $T_1$ which is sufficiently high to retain substantially all the isophthalic acid in solution, and subsequently recovering isophthalic acid from the mother liquor.

9. A method as defined in claim 8 wherein the initial ratio of aqueous reagent to trimellitic acid is at least about one liter per mole, and said temperature $T_1$ is between about 200° and 300° C.

10. A method for producing isophthalic acid and terephthalic acid from a mixture consisting predominantly of trimellitic acid, trimesic acid, hemimellitic acid, pyromellitic acid and prehnitic acid which comprises heating said acid mixture at a temperature between about 150° and 400° C. in the presence of a substantially neutral reagent which is essentially water, removing water-soluble acids from the decarboxylated mixture, and recovering a substantially water-insoluble acid mixture which consists mainly of isophthalic acid and terephthalic acid.

11. A process as defined in claim 10 wherein the said initial acid mixture is obtained by the oxidation of a mixture of isomeric C–9 and C–10 alkyl-aromatic hydrocarbons, said hydrocarbon mixture boiling between about 150° and 200° C. and having been isolated from a gasoline obtained by the catalytic hydroforming of a gasoline fraction.

12. A method for obtaining isophthalic acid and terephthalic acid from a mixture consisting predominantly of trimellitic acid, trimesic acid, and hemimellitic acid, which comprises heating said acid mixture at a temperature between about 150° and 400° C. in the presence of a substantially neutral reagent which is essentially water, removing water-soluble acids from the decarboxylated mixture, and recovering a substantially water-insoluble acid mixture which consists mainly of isophthalic acid and terephthalic acid.

13. A process as defined in claim 12 wherein the said initial acid mixture is obtained by the oxidation of a mixture of isomeric C–9 alkyl-aromatic hydrocarbons, said hydrocarbon mixture boiling between about 150° and 180° C. and having been isolated from a gasoline obtained by the catalytic hydroforming of a gasoline fraction.

14. A method for obtaining valuable acid products from gasoline hydrocarbons which comprises isolating a predominantly aromatic fraction boiling between about 150°–200° C. from a gasoline which has been subjected to catalytic hydroforming, oxidizing said fraction to form a mixture of benzene polycarboxylic acids, subjecting the resulting acid mixture to decarboxylation by heating in the presence of a substantially neutral reagent which is essentially water at between about 220°–350° C., and recovering isophthalic acid and terephthalic acid from the decarboxylation product.

References Cited in the file of this patent

UNITED STATES PATENTS 1,551,373    Daudt   ---------------- Aug. 25, 1925